United States Patent [19]

Henrickson et al.

[11] 4,030,069
[45] June 14, 1977

[54] REDUNDANT MESSAGE METERING NETWORK

[75] Inventors: Gary C. Henrickson, Palo Alto; John C. McDonald, Los Altos, both of Calif.

[73] Assignee: TRW Inc., Los Angeles, Calif.

[22] Filed: Jan. 30, 1975

[21] Appl. No.: 545,757

[52] U.S. Cl. .................. 340/147 SC; 179/175.3 R; 325/2
[51] Int. Cl.² ........................................ H04B 3/00
[58] Field of Search ............................ 340/147 SC; 179/175.3 R, 175.2 R, 175.1 R

[56] References Cited
UNITED STATES PATENTS

| | | |
|---|---|---|
| 2,680,162 | 6/1954 | Brehm ..................... 340/147 SC |
| 3,364,467 | 1/1968 | Haibt ........................ 340/147 SC |
| 3,681,694 | 8/1972 | Sarati ....................... 340/147 SC |
| 3,864,533 | 2/1975 | Erlund ...................... 340/147 SC |

*Primary Examiner*—Harold I. Pitts
*Attorney, Agent, or Firm*—Flehr, Hohbach, Test, Albritton & Herbert

[57] ABSTRACT

A redundant data transmission and storage system in which a plurality of transmission circuits are connected in series to form a channel network. Each transmission circuit includes at least two redundant data channels which are each capable of independent operation. For each transmission circuit, the selection of which channel, if any, is enabled in the active state is made by a channel control unit associated with that particular transmission circuit.

15 Claims, 4 Drawing Figures

REDUNDANT MESSAGE METERING NETWORK

CROSS-REFERENCE TO RELATED APPLICATIONS

1. REMOTE OFFICE MESSAGE METERING SYSTEM invented by John C. McDonald, Gary C. Henrickson, Alan K. Taylor and Willaim A. Settle, Ser. No. 545,489 filed Jan. 30, 1975, assigned to the same assignee as the present invention.

2. REDUNDANT DATA TRANSMISSION SYSTEM invented by John C. McDonald and James R. Baichtal, Ser. No. 365,045, filed 05/29/73, now U.S. Pat. 3,870,824 assigned to the same assignee as the present invention.

BACKGROUND OF THE INVENTION

The present invention relates to the field of data transmission and storage systems and particularly to redudant data transmission and storage systems which provide high reliability when connected in networks.

Networks are employed, for example, in telephone systems in which subscriber sets are connected together through one or more switching exchanges. In a similar manner, computers and other data processing machines are also connected together to transfer data through networks. Users of such networks require high reliability.

An example of one particular network requiring high reliability is a telephone message metering system which is employed for recording information resulting from toll, long distance and other types of telephone service. Such equipment requires the ability to detect, transmit and store information to enable usage-sensitive charging of subscribers. High reliability is required to insure that subscribers are properly charged. Local service by subscribers has generally been on a non-usage-sensitive basis and has employed equipment which has not been readily adapted for reliable metering on a usage-sensitive basis. With the advent of new types of local telephone usage such as credit-card checking, time-sharing data transmission, and burgulary prevention, a need for reliable detecting, transmitting and storing of information concerning the nature of local usage has become important.

When message metering information is to be transmitted through a network, for example, from a remote to a central telephone office, high reliability in the data transmission must still be maintained.

While the use of redundancy is well-known for improving the reliability of many data transmission and storage systems, a need still exists for providing improved reliability in data transmission systems connected in networks.

OBJECTS AND SUMMARY OF THE INVENTION

The present invention is a data transmission apparatus which includes a plurality of transmission circuits where the transmission circuits are connected in series to form a network. Each of the transmission circuits includes two or more redundant data channels.

Each transmission circuit also includes channel control circuitry for determining which one of the redundant channels will be enabled to transmit data. The channel control circuitry also includes alarm circuits to provide alarm signals associated with each of the data channels and also includes control networks responsive to the alarm signals for determining which one of the data channels is to be enabled.

The data output from a first one of the transmission circuits is connected as an input to a second one of the transmission circuits. The second transmission circuit also includes two or more redundant data channels for transmitting the data received from the first transmission circuit. The particular data channel in the second transmission circuit which is enabled to transmit the data from the first transmission circuit is controlled by a channel control circuit in the second transmission circuit.

Any number of the transmission circuits can be connected in series in a chained manner to form a network. For example, when three transmission circuits are connected in series, data is transmitted from the input of the first transmission circuit to the output of the third transmission circuit over a data path which includes one data channel from each of the three transmission circuits. Although each of the transmission circuits includes two or more data channels, only one of the data channels in each transmission circuit is active at any one time. The determination of the active data channel in each of the transmission circuits in a network is independent of the determination for each of the other transmission circuits in the network.

Connection circuits are provided between each of the transmission circuits for connecting the outputs from the data channels in one transmission circuit to the inputs of the data channels of the next transmission circuit. In one preferred embodiment, the connection circuits employ data stores which store the data output from one transmission circuit before it is input to the next transmission circuit.

In accordance with another embodiment of the invention, each transmission circuit is capable of receiving inputs from a plurality of other transmission circuits. For example, a plurality of first transmission circuits each transmit data to one of a plurality of stores. Each of the plurality of stores are connected, when selected, as inputs to a second transmission circuit. The second transmission circuit includes selection means for selecting the plurality of stores one at a time for input to the transmission circuit. In one preferred embodiment, the plurality of stores are redundant each having first and second storage locations. The selection circuits in the second transmission circuit are redundant also so that full redundancy is maintained throughout the network.

The data channels within the transmission circuits of the present invention include any conventional data paths. For example, data link employing data sets for connecting remote circuits to local circuits are included.

While the present invention includes hardware redundancy wherein at least two redundant data channels are maintained throughout a complex network of transmission circuits, that hardware redundancy is also combined with other forms of redundancy. For example, each single data channel typically includes parity bits or other redundancy bits. Similarly, retransmission redundancy is employed particularly where a data channel includes a data link for connecting information from a remote location to a local location.

In accordance with the above summary of the invention, the present invention achieves the objective of providing an improved redundant data transmission system providing improved reliability for transmission circuits connected in a network.

DESCRIPTION OF THE PREFERRED EMBODIMENTS

Figure 1:
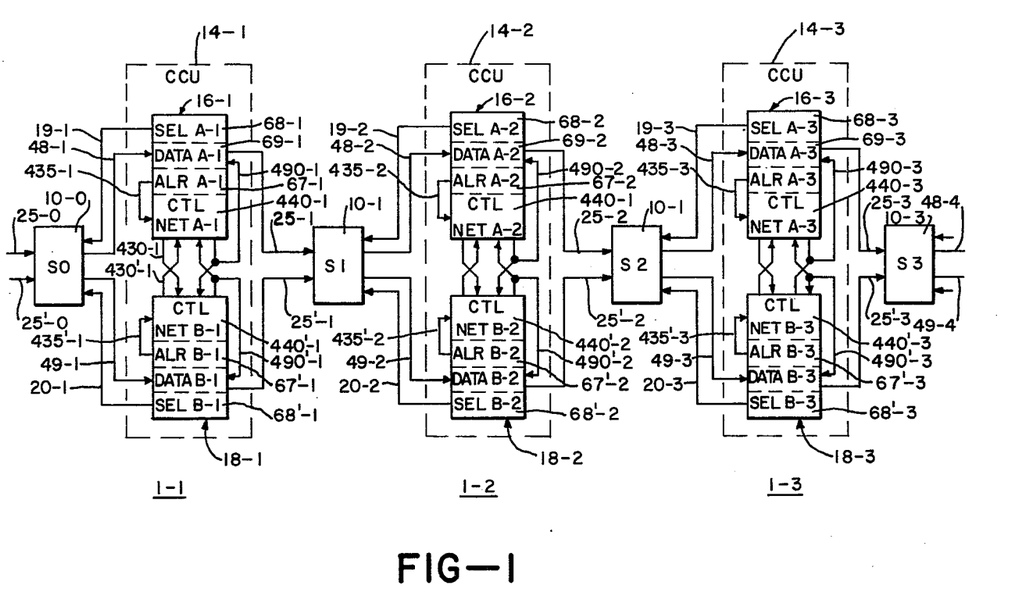
FIG. 1 is a block diagram representation of three transmission circuits connected in series where each of the transmission circuits includes first and second redundant data channels in accordance with the present invention.

In FIG. 1, three transmission circuits 1—1, 1-2 and 1-3 are shown for transmitting data between the input connection circuit 10-0 and the output connection circuit 10-3. Each of the transmission circuits includes first and second redundant data channels (an A channel and a B channel) and a channel control unit (CCU) 14. The channel control units determine which one of the data channels (A or B) in each transmission circuit is active.

In FIG. 1, the first data channel (A) of the transmission circuit 1—1 connects from input circuit 10-0, over bus 48-1, through the data portion (DATA A-1) of the channel control unit 14-1, over bus 25-1 to connection circuit 10-1.

The second data channel (B) of the transmission circuit 1-1 connects from input circuit 10-0, over bus 49-1, through the data portion (DATA B-1) of the channel control unit 14-1, over bus 25°-1 to the connection circuit 10-1. Data is transferred from connection circuit 10-0 to connection circuit 10-1 either through the first (A) data channel (buses 48-1 and 25-1 or the second (B) data channel (buses 49-1 and 25'-1 to the circuit 10-1.

The second transmission circuit 1-2 includes a first (A) data channel connecting from circuit 10-1 over bus 48-2, the data portion (DATA A-2) of channel control unit 14-2, and bus 25-2 to circuit 10-2. The second transmission circuit 1-2 includes a second (B) data channel connecting from circuit 10-1 over bus 49-2 through the data portion (DATA B-2) of the channel control unit 14-2, and over bus 25'-2 to circuit 10-2. The third transmission circuit 1-3 includes a first (A) data channel connecting over bus 48-3, the data portion (DATA A-3) of channel control unit 14-3, and the bus 25-3 to the output connection circuit 10-3. The second (B) data channel in the third transmission circuit 1-3 connects from the connection circuit 10-2, over bus 49-3, through the data portion (DATA B-1) of the channel control unit 14-3, over bus 25'-3 to the output circuit 10-3.

In each of the transmission circuits of FIG. 1, the upper data channel is called the A channel and the lower data channel is called the B channel. If all of the upper channels are active and none of the lower channels are active, then the data channel connection from circuit 10-0 to circuit 10-3 is designated AAA. If the first and third transmission circuits have the A channels active and the second transmission circuit has the B channel active, then the connection from input circuit 10-0 to output circuit 10-3 is designated ABA. In all, eight combinations of active data channels are possible for connecting circuit 10-0 to circuit 10-3. Those combinations are AAA, ABA, AAB, ABB, BAA, BBA, BBB, and BAB.

In FIG. 1, the first channel control unit (CCU) 14-1 functions to control whether the A channel or the B channel for the first transmission circuit 1-1 is active. The channel control unit 14-1 includes an A control unit 16-1 and an identical B control unit 18-1. Specific details of the A and B control unit circuitry whether for a local data path or for a remote data link are described in the above-identified cross-referenced application REMOTE OFFICE MESSAGE METERING SYSTEM. In general, the A data path circuitry for the unit 16-1 includes a control network (CTL NET A-1) 440-1, an alarm circuit (ALR A-1) 67-1, a data path (DATA A-1) 69-1, and selection circuitry (SEL A-1) 68-1. In a similar manner B circuitry 18-1 includes the identical units with a post script B-1. The control networks 440-1 in the A circuitry and the control network 440'-1 in the B circuitry are described in detail in connection with FIG. 3 hereinafter.

The alarm circuits (ALR A-1 and ALR B-1) 67 function to provide alarm signals on the buses 435-1 and 435'-1 to the control networks 440-1 and 440'-1, respectively. The alarm signals, in general, are of two classes for signaling alarm conditions associated with the A or B channels. Control networks 440-1 and 440'-1 are interlocked by the lines 430-1 and 430'-1 and the enable lines 490-1 and 490'-1. The control networks 440-1 and 440'-1 enable the A and B channels as a function of the alarm signals on lines 435-1 and 435'-1. The output line 490-1 from the A-1 control network 440-1 enables and disables the data path A-1 circuitry 69-1 and similarly the 490'-1 output from the B-1 control network 440'-1 enables or disables the B-1 data path circuitry 69'-1.

The selection circuit (SEL A-1) 68-1 and selection circuit (SEL B-1) 68'-1 function to provide the selection signals on lines 19-1 and 20-1 which connect to the input connection circuit 10-0.

In a preferred embodiment, input circuit 10-0 is a redundant store (SO) which provides a data output on the bus 48-1 whenever the line 19-1 is selected or provides the same data output on line 49-1 whenever the line 20-1 is selected.

When the control network 440-1 enables the A-1 circuitry to render the A data channel active, data from circuit 10-0 is transmitted over bus 48-1 to bus 25-1 and circuit 10-1. Whenever the control networks enable the B data channel, data is transmitted from input circuit 10-0 over bus 49-1 to bus 25'-1 and the circuit 10-1. The circuit 10-1, in one preferred embodiment, is a simple OR gate which connects the A1 and B1 data channels to the A2 and B2 data channels and selection lines 19-2 and 20-2 are unnecessary. In another preferred embodiment, however, connection circuit 10-1 is a redundant store. As a redundant store, the data is output either on bus 48-2 or bus 49-2 depending upon selection by lines 19-2 or 20-2, respectively.

In general in FIG. 1, the circuitry in the second and third transmission circuits 1-2 and 1-3 are identical to the circuitry in the first transmission circuit. Corresponding elements are identified with a post script "1" in the first transmission circuit, a post script "2" in the second transmission circuit and a post script "3" in the third transmission circuit. Redundant Stores FIG. 2

Figure 2:
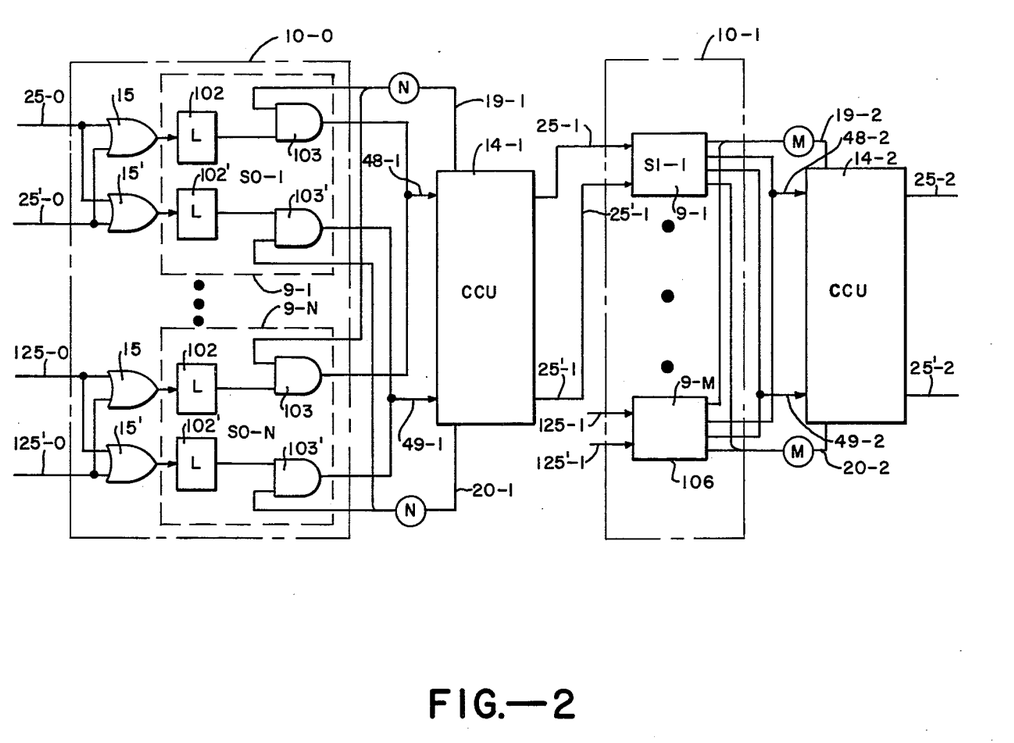
FIG. 2 depicts a block diagram representation of a portion of the FIG. 1 apparatus in which a plurality of redundant stores connect two of the FIG. 1 transmission circuits.

In FIG. 2, further details of one embodiment of the connection circuits 10-0 and 10-1 of FIG. 1 are shown where each of those stores includes a plurality of redundant latch circuits 11.

In FIG. 2, the input connection circuit 10-0 includes a plurality of redundant stores 9-1 through 9-N. The number N can be any interger which is equal to 1 or greater. The first store (S0-1) 9-1 is typical. Store 9-1 includes a first OR gate 15 and a second OR gate 15'. Both gates 15 and 15' receive both input buses 25-0 and 25'-0. Gate 15 functions to latch data from either bus 25-0 or bus 25'-0 into latch 102. Gate 15' functions to latch data from either of the buses 25-0 and 25'-0 into the latch circuit 102'. Only one of the buses 25-0 and 25'-0 is active at any given time and the active one has its data stored in both latches 102 and 102'.

The data output from the latches 102 and 102'is input to the selection AND gates 103 and 103', respectively. Latch circuit 102 and gate 103 are active whenever the A data channel is specified by a selection line from the selection bus 19-1. Similarly, latch 102' and gate 103' are part of the B data channel and are active when selected by one of the selection lines from the selection bus 20-1. The number of selection lines 19-1 and the number of selection lines 20-1 is equal to N which also equals the number of redundant stores 9 within the input connection circuit 10-0. Specifically, there is one selection line for each of the N latches (latches 102) and selection gates (gates 103) associated with the A data channel and there is one selection line for each of the N latches (latches 102') and selection gates (gates 103') associated with the B data channel.

The N outputs from each of the A data channel circuits are connected in common as the A data channel bus 48-1 for input to the channel control unit 14-1. Similarly the N outputs from the B data channel circuits are connected in common to form the B data channel bus 49-1 input to the channel control unit 14-1. Only one of the data latches and selection gates in the connection circuit 10-0 is activated at any given time, on a time multiplexing basis, by a single energization of a selection line in either the A selection bus 19-1 or the B selection bus 20-1 by operation of the channel control unit 14-1. If the A data channel is selected, the bus 48-1 data appears on the output bus 25-1. If the B data channel is selected, the bus 49-1 data appears on output bus 25'-1.

The output buses 25-1 and 25'-1 for the A and B data channels, respectively, are input to the connection circuit 10-1 where they are input to a redundant store (S1-1) 9-1. Store 9-1 in the connection circuit 10-1 is identical to the store 9-1 in the connection circuit 10-0.

Store 9-1 in the connection circuit 10-1 stores the data which appears on the active one of the buses bus 25-1 or 25'-1. Only one of the buses 25-1 or 25'-1 is enabled active at any given time and the active one is determined by channel control unit 14-1. The data stored in redundant store 9-1 of connection circuit 10-1 is transmitted from circuit 10-0 to circuit 10-1 either over the A data channel or the B data channel under control of the channel control unit 14-2.

If channel control unit 14-2 selects the A data channel, then one of the selection lines 19-2 will select the data from store 9-1 on the bus 48-2 and connect it to the bus 25-2. If the channel control unit 14-2 selects the B data channel, then the data stored in redundant store 9-1 is connected from bus 49-2 to bus 25'-2.

While channel control unit 14-2 is operative to select either an A data channel or a B data channel for data in the store 9-1 or circuit 10-1, connection circuit 10-1 typically includes M redundant stores 9-1 through 9-M which are all selected to place data either on the A data channel bus 48-2 or on a B data channel bus 49-2. The M data stores 9-1 through 9-M in connection circuit 10-1 are identical to the N data stores in the connection circuit 10-0. The number of stores M, however, can be any interger equal to 1 or greater and does not have to be the same number as the N redundant stores in the 10-0 circuit.

While the FIG. 2 circuit is representative of a portion of the FIG. 1 circuit which includes two transmission circuits 1-1 and 1-2, the principles employed within FIG. 2 can be extended to any number of transmission circuits. For example, the third transmission circuit 1-3 of FIG. 1 can include any number of redundant stores within the connection circuit 10-2 which may or may not equal M or N.

In FIG. 2, only two channel control units 14-1 and 14-2 have been shown. Many additional channel control units can be interconnected. For example, an additional network like FIG. 1 can be employed in addition to the circuit of FIG. 2. One possible configuration is to utilize the output buses 48-4 and 49-4 from the connection circuit 10-3 as inputs to the connection circuit 10-1 of FIG. 2. In this configuration, output buses 48-4 and 49-4 from FIG. 1 connect to the lines 125-1 and 125'-1, respectively, for the store 9-M within the connection circuit 10-1. With such a configuration, the channel control unit 14-1 of FIG. 2 and the channel control unit 14-3 of FIG. 1 are essentially in parallel and feed in a "tree" fashion through the connection circuit 10-1 of FIG. 2 to the channel control unit 14-2 of FIG. 2.

From the above description, it is evident that each of the connection circuits of FIG. 1 and FIG. 2 performs the function of a tree circuit in which many inputs are necked-down to a single output. In accordance with the present invention, however, double redundancy is maintained throughout the tree circuits. Each of the channel control units of FIG. 1 and FIG. 2 functions to time multiplex the data from many stores while full double redundancy is maintained. Control Networks - FIG. 3

Figure 3:
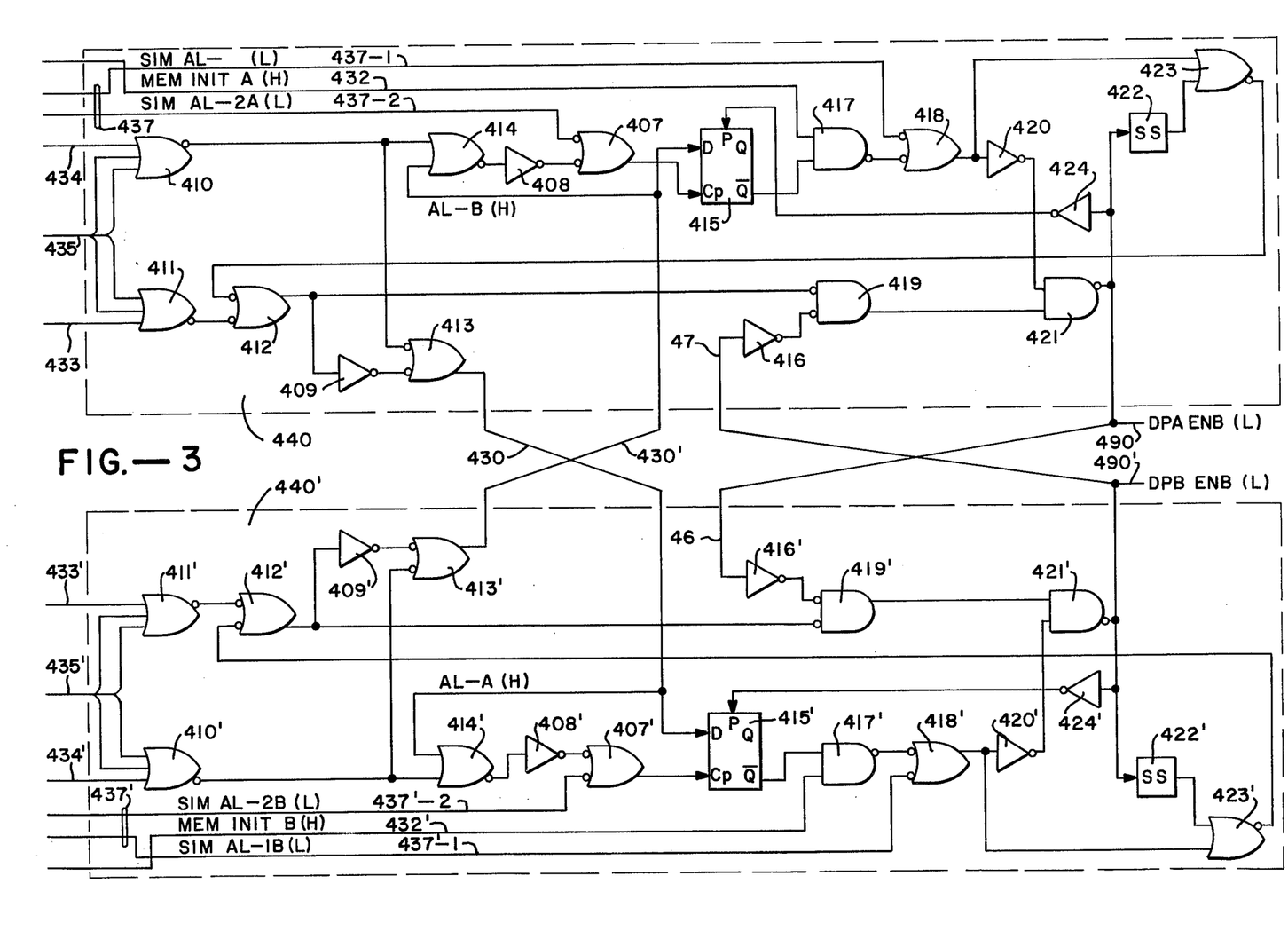
FIG. 3 depicts a schematic representation of interconnected control networks like those employed within each of the transmission circuits of FIG. 1.

In FIG. 3, the details are shown for the control networks 440 and 440' of FIG. 1. The control network 440 for the data path A is identical to the control network 440' for the data path B and in FIG. 3 the corresponding elements in the network 440' are identified with primed numbers to show their correspondence with the unprimed numbers in network 440.

The alarm signals are input to the control network 440 on lines 433, 434 and 435. The alarm 433 is a class I alarm derived, for example, from a tape speed monitor (not shown) associated with the storage unit 22 of FIG. 4. The alarm 434 is a class II alarm which is derived from a calendar clock comparator (not shown) in the common control 17 of FIG. 4. The alarm bus 435 includes both class I and class II alarms. Further details of the alarm circuits suitable for generating the alarms of lines 433 and 434 are described in the above-identified cross-referenced application REDUNDANT DATA TRANSMISSION SYSTEM. In FIG. 1, the alarm circuits 67 are a general representation for many different alarm signals. The circuits 67 include, for example, parity detectors which detect improper parity of the data through the A data channels. Similarly, the alarm circuits 67' include parity detectors for detecting improper parity of the data through the B channels.

The class I alarms, of which the alarm on line 433 is typical, are input to NOR gate 411 which has its output connected to NAND gate 412. Any of the inputs to gate 411 are high or binary 1 for any alarm condition and are low or binary 0 for any non-alarm condition. Gate 412, in addition to the signals from gate 411 receives the output from NOR gate 423.

The output from gate 412 is input to the NOR gate 419 and input to inverter 409. Gate 419 switches its output to a 1 in response to a no alarm signal 0 from the gate 412 provided the enabling line 490' from the network 440' is inverted to 0 through the inverter 416. Gate 419 has its output connected to NAND gate 421. Gate 421 also receives an output from the inverter 420. NAND gate 421 is an enabling means which is responsive to an alarm signal, for example any alarm signal introduced through NOR gate 411, for forcing the data path A inactive. Gate 421 is also responsive to any alarm signal which is propagated through inverter 420.

Gate 421 has its output connected as an input to the control network 440' through the inverter 416'. In a similar manner, NAND gate 421' is an enabling means which is responsive to an alarm signal in the data B for forcing data path B in the inactive state by controlling the signal on line 490'. Line 490' connects its input to the control network 440 via the inverter 416.

The NOR gate 419 is, therefore, a means responsive to the inactive state of the other data path, data path B, for enabling data path A in the active state by providing an output to the NAND gate 421.

The inactive state of data path B, represented by a 1 on line 490', is operative to enable data path A in the active state provided no alarm exists which is associated with data path A. The no alarm condition is represented by a 0 output from the NAND gate 412 which serves as one input to the NOR gate 419. If an alarm exists, the gate 412 output is a 1 so that the output of NOR gate 419 will remain low independent of the 1 or 0 level of the line 490'.

The class II alarms are input to the control networks through the NOR gates 410 and 410'. The output from gate 410 is connected as an input to NOR gate 414 and NAND gate 413.

The function of gate 413 is to produce a 1 on output line 430 whenever a class I or II alarms exist. Similarly, any alarm in the network 440' produces a 1 on line 430' which is also input to the gate 414. Gate 414 functions to transmit a class II alarm, received as a 0 from gate 410, by providing by a 1 on its output unless there is a 1 on line 430' signalling an alarm condition in the network 440'. Gate 414 is connected through inverter 408 to a NAND gate 407. Gate 407 also receives a simulated alarm signal on line 437-2 which is normally in a 1 state unless a simulated class II alarm is being generated. NAND gate 407 connects to the clock input C of a conventional D-type flip-flop 415. Flip-flop 415 is operative to store the value on its D input derived from line 430', at a time when its clock input has a positive going pulse. The flip-flop 415 is normally in the high state with the Q output a 1 and the $\overline{Q}$ output a 0. Provided there is no alarm in the network 440', a class II alarm strobes the C input to flip-flop 415 thereby storing the 0 state on the D input forcing the $\overline{Q}$ output to a 1 and the Q output to a 0.

The output from flip-flop 415 is gated through NAND gate 417 to a NAND gate 418. Gate 417 may be continuously enabled or alternatively is gated by a control line 432. The line 432 may be employed to indicate when the information in the data path A has been successfully stored in the output storage. For example, in FIG. 1, circuit 10-1 provides an output (not shown) when data from channel control unit 14-1 has been stored. When operated in this fashion, line 432 insures that any class II alarm stored in flip-flop 415 will not be recognized by the control network 440 until a gating pulse is received on line 432. Alternatively, when line 432 is set to a 1 at all times, gate 417 merely operates as an inverter.

NAND gate 418 receives the output from gate 417 and connects it to inverter 420 and the NOR gate 423. The other input to gate 418 is derived from line 437-1 which may be employed to simulate class I alarms. When simulating a class I alarm, line 437-1 is a 0 and at any other time is a 1. Any class II alarm from flip-flop 415, or any simulated alarm from lines 437-1 and 437-2, provides an alarm input to inverter 420 and the enabling means 421. In this fashion, the class II alarms or the simulated alarms are operative to disable the data path A in the same manner that the class I alarms disable the data path A through the NOR gate 419.

The function of the NOR gate 423 is to provide a signal back to the NAND gate 412 which in turn connects through inverter 409 to the gate 413. The output of gate 413 signals the existence of an alarm or a simulated alarm in the network 440.

The single-shot 442 senses a 0 to 1 transition from the output of gate 421 and provides a 1 level pulse into the NOR gate 423. Single-shot 422 insures that even short duration outputs of gate 421 will be sensed. The output of gate 423 connects to the gate 412 and returns through gate 419 as an input to gate 421. Gate 421 is then held in the 1 state as a result of the action of single-shot 422.

While the inputs on lines 437-1 and 437-2 have been indicated as simulated alarms, they also can be considered as alarm signals of a different priority than the class I and class II alarms.

The operation of the control networks 440 and 440' of FIG. 3 are described in connection with the following CHART I in which fifteen cases of alarm conditions and activity states are shown. The alarm conditions selected for examples are those of tape speed error for class I type alarms and calendar clock error for class II alarms.

In case 1 of CHART I the condition is represented where no alarm of any type exists for either data path A or data path B. Under these conditions, the lines 433, 435, 433' and 435' are all in the 0 state. The prealarm status of the enable lines 490 and 490' remains as the postalarm status in the absence of alarms. Specifically in case 1, line 490 as a 0 enables data path A active while line 47 as a 1 forces data path B inactive as indicated in CHART I under L490 and L490' columns.

CHART I

| PREALARM | | ALARMS | | | | POSTALARM | |
|---|---|---|---|---|---|---|---|
| | | DP A | | DP B | | | |
| DP A | DP B | L433 | L435 | L433' | L435' | DP A | DP B |
| L490 | L490' | AL I | AL II | AL I | AL II | L490 | L490' |

| CASE | | | | | | | |
|---|---|---|---|---|---|---|---|
| 1 | 0 | 1 | 0 | 0 | 0 | 0 | 0 | 1 |
| 2 | 1 | 0 | 0 | 0 | 0 | 0 | 1 | 0 |
| 3 | 0 | 1 | 1 | 0 | 0 | 0 | 1 | 0 |
| 4 | 1 | 0 | 1 | 0 | 0 | 0 | 1 | 0 |
| 5 | 0 | 1 | 0 | 1 | 0 | 0 | 1 | 0 |
| 6 | 1 | 0 | 0 | 1 | 0 | 0 | 1 | 0 |
| 7 | 0 | 1 | 1 | 0 | 1 | 0 | 1 | 1 |
| 8 | 0 | 1 | 0 | 1 | 1 | 0 | 0 | 1 |
| 9 | 1 | 0 | 0 | 1 | 1 | 0 | 0 | 1 |
| 10 | 0 | 1 | 0 | 1 | 0 | 1 | 0 | 1 |
| 11 | 1 | 0 | 0 | 1 | 0 | 1 | 1 | 0 |
| 12 | 0 | 1 | 1 | 1 | 0 | 1 | 1 | 0 |
| 13 | 1 | 0 | 1 | 1 | 0 | 1 | 1 | 0 |
| 14 | 0 | 1 | 1 | 0 | 0 | 1 | 1 | 0 |
| 15 | 1 | 0 | 1 | 0 | 0 | 1 | 1 | 0 |

Referring to FIG. 3 where the base 1, CHART I, prealarm status has a 0 for line 490 and a 1 for line 490', the inputs on all lines 433, 434 and 435 and their respective primed counterparts for the control network 440' are 0. With 0's on the inputs to NOR gate 411, its output is a 1 to the NAND gate 412. The 1 input to gate 412 coupled with a 1 input from NOR gate 423 produces a 0 output from gate 412. The 0 output from gate 412 is in input to NOR gates 419. Since for case 1 of CHART I the output on line 490' is a 1, the inverter 416 converts that 1 to a 0 as the second input to NOR gate 419. The two 0 inputs to the gate 419 produce a 1 output NAND gate 421. Gate 421 combines the 1 output from inverter 420 and gate 419 to produce a 0 output which enables data path A.

Still referring to case 1 of CHART I, the output from the NOR gate 410 with 0 inputs for all class II alarms is a 1. The 1 from gate 410 is supplied to the NOR gate 414 and the NAND gate 413. Under the no alarm condition, gate 413 receives the 1 from gate 410 and receives a 1 from inverter 409 so as to produce a 0 on output line 430 indicating that no alarm exists in the network 440. In a similar manner, the network 440' produces a 0 on line 430' indicating that no alarm exists in the network 440'. The 0 on line 430' together with the 1 from gate 410 are input to the NOR gate 414. Gate 414 produces a 0 output which is converted to a 1 by inverter 408 and input to the NAND gate 407. The other input on line 437-2 to gate 407 is normally a 1 so that gate 407 produces a 0 output. The 0 output from gate 407 is input to the flip-flop 415 and does not trigger flip-flop 415 since no positive-going transition occurs. Flip-flop 415 has been preset with a 1 on its Q output by the inverter 425 which inverts the 1 on line 490 to a 0 at the P input of the flip-flop 415. With flip-flop 415 preset, it has a 0 on its $\overline{Q}$ output so that NAND gate 417 has its output forced to a 1 independent of the normally 0 input on line 432.

Line 437-1 is a 1 so that the two 1 inputs to NAND gate 418 combine to produce a 0 output. That 0 output is connected to NOR gate 423 and is converted to a 1 in inverter 420. The 1 from inverter 420 along with the 1 from the NOR gate 419 together produce the 0 output from NAND gate 421 thus enabling data path A with a 0 on line 490.

With a 0 output from NAND gate 418, and with a 0 output from the single-shot 422, the output from NOR gate 423 is a 1. The 1 is input to the NAND gate 412 which provides the 0 output as previously described.

In case 1 of CHART I the prealarm and postalarm conditions of lines 490 and 490' are not changed. In a similar manner, in case 2 the prealarm and postalarm conditions of lines 490 and 490' are not changed because again no alarms are generated.

Referring now to case 3 of CHART I, the prealarm conditions have data path A active as indicated by the 0 in the L490 column and has data path B inactive as indicated by the 1 in the L490' column. Data path A is operative in case 3 with a class I type alarm as indicated by a 1 in the line 43 column. No other alarms exist in data path A or data path B as indicated by the 0's in the columns L435, L433' and L435'. The postalarm status of data path A and data path B results in data path A inactive as indicated by the 1 in the L490 postalarm column with data path B active as indicated by the 0 in the L490' postalarm column.

Referring to FIG. 3 with a class I alarm, line 433 switches from 0 to 1. With the 0 to 1 transistion on line 433, the NOR gate 411 has its output switch from a 1 to a 0, responsively. The 1 to 0 input to NAND gate 412 forces its output from 0 to 1. That 0 to 1 transition is input to the NOR gate 419 causing the gate 419 to have an output which changes from 1 to 0. The transition of NOR gate 419 is independent of the input level from the inverter 416. The output of gate 419 therefor, goes from 1 to 0 providing a 1 to 0 input to NAND gate 421. The 0 input to gate 421 foces its output to switch from 0 to 1. Accordingly, line 490 designates the inactive state of data path A providing a 1 input to the inverter 416'. The output of inverter 416' therefor, switches from 1 to 0 providing an input to NOR gate 419'. In the absence of any alarms in the data push B, the output of NAND gate 412' is a 0 so that NOR gate 419' receives two 0's on its inputs. The 0 inputs cause a change from a 0 to a 1 on the output of gate 419. Since the output from gate 420' is also a 1 in the absence of any alarm signal, the two 1 inputs to NAND gate 421' force a 0 output on line 490'. Line 490' with a 0 enables data path B in the active state while path A has been switched to the inactive state.

Referring now the CHART I, case 4, data path B is active and data path A is inactive when an alarm associated with data path A occurs. Under these conditions, no change occurs in the postalarm status of data path A and data path B. No change in the control networks 440 and 440' occurs because in case 4 with line 490' a 0, the output from inverter 416 is a 1 and the 0 to 1 transition on the other input to NOR gate 419 has no effect since gate 419 already has a 0 output. Any 0 input to NAND gate 421 forces its output to a 1.

Referring to CHART I, case 5, data path A is active and data path B is inactive. A class II alarm occurs as indicated by the 1 in the L435 column and no other alarms are present. The postalarm condition reveals data path A switched to inactive while data path B is switched to active.

Referring now to FIG. 3, in the case 5 of CHART I, the 0 to 1 transition on line 435 signals a class II alarm and causes the NOR gate 410 output to go from 1 to 0. The 1 to 0 transition is input to the NOR gate 414 causing its output to go from 0 to 1 which is inverted in inverter 408 causing a 1 to 0 transition on the input to NAND gate 407. A 0 input to gate 407 forces its output from 0 to 1 rendering a positive going transition on the clock input to flip-flop 415 causes the flip-flop to store the level of the signal on its D input. That D input is derived as the output of the line 430' from the control network 440'. In the absence of an alarm associated with data path B, line 430' is a 0. That 0 is stored in flip-flop 415 causing its Q output to be a 1. The 1 output from flip-flop 415 coupled with the 1 on line 432 after the memory pulse occurs, forces the output of gate 417 to a 0. The 0 input to gate 418 forces its output to a 1 which is inverted in inverter 420 to a 0. The 0 input to NAND gate 421 forces its output to a 1 thereby, forcing data path A to the inactive state. The 1 output from gate 418 is also received by NOR gate 423 forcing its output to a 0 which is received by NAND gate 412. Gate 412 receiving a 0 input forces its output to a 1 which is inverted in inverter 409 to a 0 forcing NAND gate 413 to have a 1 output which thereby signifies that the control network 440 senses an alarm. The 1 output from NAND gate 421 is inverted in inverter 416' of the control network 440' to a 0. In the absence of any alarm signal from gate 412', the other input to NOR gate 419' is a 0 so that the two 0's force the output from gate 419' to a 1. The NAND gate 421' therefore, receives two 1 inputs forcing its output on line 490' to a 0 thereby placing data path B in the active state.

While a number of the cases of CHART I have been described in detail, each of the other cases in CHART I similarly cause the apparatus of the present invention to operate as indicated. While other permutations of the variables indicated in CHART I are possible, they are subsumed into the cases represented in the CHART I.

Figure 4:
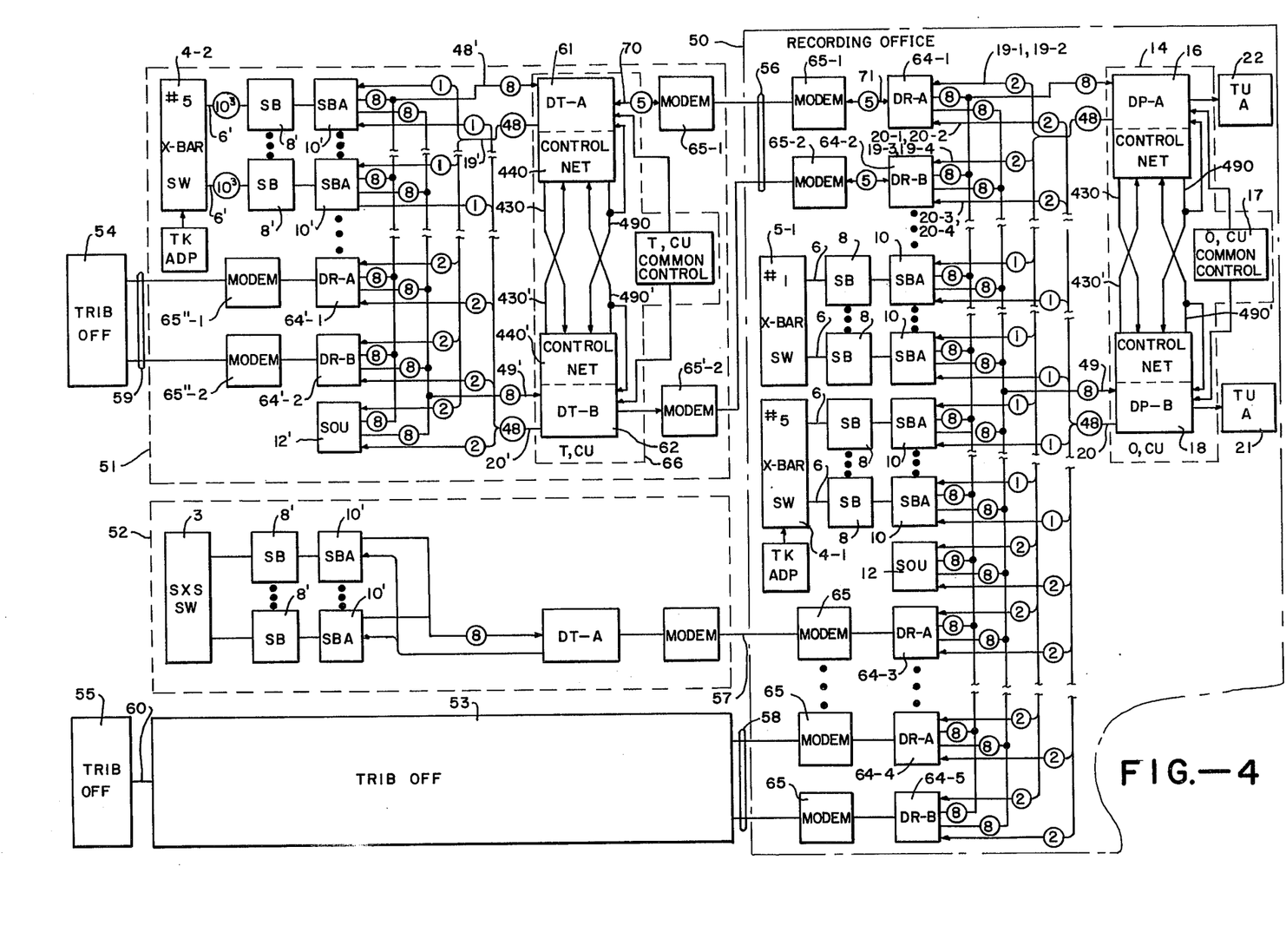
FIG. 4 depicts a block diagram representation of transmission circuits in accordance with the present invention interconnected to form a telephone message metering network for metering subscriber usage-information for subscriber units in a telephone system.

Telephone Message Metering Network- FIG. 4

In FIG. 4, a telephone message metering network is depicted which includes telephone recording office circuitry 50 and a plurality of telephone tributary offices 51 through 55. The recording office metering system 50 of FIG. 4, in a preferred embodiment, is like that described in U.S. Pat. No. 3,818,456 with the addition of data receivers 64 and modems 65 for connecting remote tributary offices (51-54) to the system over data links. Those additions are described in the above-identified cross-referenced application REMOTE OFFICE MESSAGE METERING SYSTEM.

The tributary office 51 connects to the recording office 50 via a redundant, 2-channel data link 56. The tributary office 51 is itself connected to a further remote tributary office 54 via a redundant, 2-channel data link 59.

The tributary office 52 is connected to the recording office through a 1-channel data link 57. The tributary office 53 is connection through a redundant, 2-channel data link 58 to the recording office 50. The tributary office 53 is itself connected to a remote tributary office 55 via the 1-channel data link 60.

The number and arrangement of tributary offices with respect to the recording office is, of course, flexible. Additional tributary offices like tributary offices 51, 52 and 53 can be connected over 1-channel or 2-channel data links to the recording office 50. Further, additional tributary offices, like tributary offices 54 and 55, can be connected through other tributary offices to the recording office 50. Still further, additional tributary offices (not shown) can be input to the tributary offices 54 and 55 to form chains of three or more tributary offices which ultimately connect to the recording office 50.

Each tributary office includes a conventional subscriber switch such as a number 1 crossbar switch (5-1), a number 5 crossbar switch (4-1), a step-by-step switch (3) or a panel switch (not shown). In FIG. 4, one representative configuration includes a number 1 crossbar switch 5-1 and a number 5 crossbar switch 4-1 within the recording office 50. The tributary office 51 includes a number 5 crossbar switch 4-2. The tributary office 52 includes a step-by-step switch 3. The types of switches within the tributary offices 53, 54, and 55 are not specifically identified but include any subscriber switch such as the conventional ones indicated.

In each of the offices, the various switches have as their outputs metering lines 6 which carry subscriber signals associated with each subscriber unit for indicating subscriber unit usage of the telephone system. A typical interconnection of the subscriber lines 6 for a number 1 crossbar switch is described in U.S. Pat. No. 3,818,456, column 4, lines 1 through 19. That description is hereby incorporated by reference in this application for purposes of teaching the connection of metering lines to a standard switching circuit. All of the metering lines 6 in the FIG. 4 system function to transmit subscriber usage signals. The usage signals are analyzed in the scanner banks 8 to provide subscriber usage data indicating usage of the telephone system by each of the subscriber units. That usage data for all of the metering lines 6 is stored in the scanner bank adapters 10. The usage data is transferred over a data path through the output and control unit (O CU) 14 for storage in a storage unit 21 or 22. The storage units are typically a tape unit A (TU A) 22 or a tape unit B (TU B) 21.

In FIG. 4, the recording office 50 has the number 1 crossbar switch metering line outputs organized in groups of 1,000 ($10^3$). Each group of 1,000 subscriber metering lines 6 connects to a scanner bank 8. Each scanner bank functions to periodically address the 1,000 input subscriber metering lines for metering signals to encode the subscriber signals to form digital representations. Each scanner bank is associated with a scanner bank adapter 10 which analyzes the encoded outputs from a scanner bank and stores usage data in storage locations for each subscriber unit. The subscriber usage data stored in the scanner bank adapters is transferred over one of two redundant data paths 48 or 49 which connect to the output and control unit 14. The redundant data paths 48 and 49 are under common control of the data path circuits 16 and 18, respectively, which function to buffer and control the transfer of data to the external storage units 22 and 21, respectively.

Additional scanner bank adapters 10 connect from the number 5 crossbar switch, through scanner banks 8, to also provide outputs on one of the other of the redundant data paths 48 or 49. In a similar manner, a service observing unit (SOU) 12 connects with outputs to the data path 48 and the data path 49.

In addition to the scanner bank adapters (SBA) and the service observing unit (SOU), data receivers (DR) 64 have outputs connecting to the redundant data paths 48 and 49. The data receivers store data from the remote tributary offices.

The output and control unit 14 is operative to sequentially scan the internal storage units consisting of the scanner bank adapters 10, the service observing unit 12, and the data receivers 64. Only one of the internal storage units is connected to either the A data path 48 or the B data path 49 at any one time. While the output and control unit 14 is scanning the internal storage units in the recording office, the tributary office systems are operating to transmit information over the data links 56, 57 and 58 to the data receivers (internal stores) in the recording office.

Referring to tributary office 51 for example, the number 5 crossbar switch 4-2 outputs metering lines 6' in groups of 1,000. The scanner banks 8' periodically address the lines 6' to provide encoded digital signals to the scanner bank adapters 10'. The scanner bank adapters 10' in the tributary office 51 analyze the digital signals and store data representative of subscriber usage. Each of the scanner bank adapters communicates over an A' data path, which is an 8-bit bus 48', or a B' data path which is an 8-bit bus 49'. The data paths 48' and 49' connect as inputs to transmit and control unit (T CU) 66. The transmit and control unit 66 in the tributary office 51 is analogous to the output and control unit 14 in the recording office. The transmit and control unit 66 includes the A data transmitter (DT A) circuitry 61 and the B data transmitter (DT B) circuitry 62. In addition to the scanner bank adapters 10', the data paths A' and B' are connection to data receivers 64'-1 and 64'-2. The data receivers 64' receive and store information from the remote tributary office 54 over the redundant, 2-channel data link 59. A service observing unit 12' also connects to the buses 48' and 49'.

The transmit and control unit 66 is operative to sequentially scan the internal stores in tributary office 51 which include the scanner bank adapters 10', the data receivers 64' and the service observing unit 12'. Only one of the internal stores is connected to either the A' path or the B' data path at any one time.

While the message metering system in the tributary office 51 is operating, the tributary office 54 in a similar manner has its message metering system operating. Message metering data is transferred from tributary office 54 to tributary office 51 for storage in a data receiver 64'. In turn, the transmit and control unit 66 controls the transmission of data from receivers 64' (associated with tributary office 54) as well as data from scanner bank adapters 10' (associated with tributary office 51) to the data receivers 64 within the recording office 50. In the recording office 50, the output and control unit 14 functions, to transmit usage data to the external storage units 21 or 22. That data includes usage information associated with the tributary office 54, the tributary office 51, and the recording office 50.

At the same time and in a similar manner, the output and control unit 14 collects usage data directly from the tributary offices 52 and 53 and from the tributary office 55 via office 53 in a manner which is apparent from the FIG. 4 apparatus.

The details of the scanner banks 8, the scanner bank adapters 10, and the output and control unit 14 (and their primed equivalents) are described in U.S. Pat. No. 3,181,456. The control networks of the system are described in the above-identified cross-referenced application REDUNDANT DATA TRANSMISSION SYSTEM (Ser. No. 365,045). The transmit and control unit 66, the modems 65 forming data links, and the data receivers 64 are described in further detail in the above-identified cross-referenced application REMOTE OFFICE MESSAGE METERING SYSTEM.

In summary, the transmit and control unit 66 is similar in structure to the output and control unit 14. The unit 66 includes an A data transmitter (DT A) 61 and an identical B data transmitter (DT B) 62. The A data transmitter is connected to receive the A' data path bus 48' and the B data transmitter is connected to receive the B' data path 49'. The A' and B' data paths connect from the scanner bank adapters 10', the data receivers 64' and the service observing unit 12'. The data transmitter 61 includes a control network 440 which controls the active and inactive state of the A data transmitter. In a similar manner, the B data transmitter includes a control network 440' which controls the active and inactive state of the B data transmitter.

What is claimed is:

1. A data transmission network for transmitting data comprising,
   first transmission circuit means including redundant first and second data channels each operable, when enabled, to transmit data,
   first channel control means including first alarm means for providing first alarms in response to alarm conditions associated with transmission of data over said first and second data channels and including first control network means responsive to said first alarms for enabling said first and second data channels,
   second transmission circuit means including redundant third and fourth data channels each operable, when enabled, to transmit data received from said first or said second data channels,
   second channel control means including second alarm means for providing second alarms in response to alarm conditions associated with transmission of data over said third and fourth data channels and including second control network means responsive to said second alarms for enabling said third and fourth data channels,
   connection means including first connection means for connecting said first or said second data channel to said third data channel and including second connection means for connecting said first or said second data to said fourth data channel.

2. The apparatus of claim 1 wherein said connection means includes store means for storing data received from an enabled one said first and second data channels and for providing said data as an output to an enabled one of said third or fourth data channels.

3. The apparatus of claim 2 wherein said store means includes first and second redundant stores.

4. The apparatus of claim 2 including additional data channels and wherein said connection means includes a plurality of stores where one of said stores is connected to store data from said first and second data channels and where others of said plurality of stores are connected to store data from said additional data channels, and wherein said second channel control means includes means for selecting said plurality of stores one at a time to input data to an enabled one of said third and fourth data channels.

5. The apparatus of claim 4 wherein said plurality of stores each includes redundant first and second storage locations and wherein said second channel control means includes means for selecting one of said first and said second storage locations for each of said plurality of stores.

6. The apparatus of claim 1 including,
first connection means having first and second redundant stores for providing data as an input to an enabled one of said first and second data channels, and wherein said first channel control means includes first selection means for connecting one of said first and second redundant stores to an enabled one said first and said second data channels, respectively,
and including second connection means having third and fourth redundant stores for receiving data from said enabled one of said first and second data channels and wherein said second channel control means includes second selection means for connecting one of said third and fourth redundant stores to an enabled one of said third and fourth data channels, respectively.

7. The apparatus of claim 1 wherein said first control network means includes first and second interconnected control networks for enabling one at a time said first and second redundant data channels, respectively, and wherein said second control network means includes third and fourth interconnected control networks for enabling one at a time said third and fourth redundant data channels, respectively.

8. The apparatus of claim 1 including first connection means having first store means for storing data for input to an enabled one of said first and second data channels and including second connection means having second store means for storing data output from said enabled one of said first and said second data channels and for providing said data as an input to an enabled one of said third and fourth data channels.

9. The apparatus of claim 1 wherein said first alarm means includes means for providing said first alarms as first and second alarm signals associated with said first and second data channels, respectively, and wherein said first control network means includes first and second interconnected control networks responsive to said first and second alarm signals, respectively, for enabling one at a time said first and second data channels, and wherein said second alarm means includes means for providing said second alarms as third and fourth alarm signals and wherein said second control network means includes third and fourth interconnected control networks responsive to said third and fourth alarm signals, respectively, for enabling one at a time said third and fourth data channels, respectively.

10. The apparatus of claim 9 including means for producing said first and second alarm signals in response to alarms of different priorities and including means for producing said third and fourth alarm signals in response to alarms of different priorities, said apparatus including means for enabling one of said first and second data channels active in response to an alarm associated with the other of said first and second data channels providing that said other of said first and second data channels does not have an alarm of a higher priorty and further including means for enabling one of said third and fourth data channels active in response to an alarm associated with the other of said third and fourth data channels providing that said other of said third and fourth data channels does not have an alarm of higher priority.

11. The apparatus of claim 1 including additional transmission circuit means each having redundant additional data channels where each additional data channel is operable, when enabled, to transmit data, and including additional channel control means having additional alarm means for providing additional alarms in response to alarm conditions associated with transmission of data over said additional data channels and including additional control network means responisve to said additional alarms for enabling said additional data channels.

12. The apparatus of claim 1 wherein said first channel control means includes means for detecting when said data has not been transferred by said first transmission circuit means without error and wherein said first channel control means includes means for causing said data to be transferred over an enabled one of said first and second data channels a plurality of times when said data has not been transferred without error.

13. A data transmission network for transmitting data comprising,
first transmission means including a plurality of independent and redundant first data channels wherein each of said data channels is activated to transmit data by a different first enabling signal,
first channel control means including first alarm means for providing first alarm signals in response to alarm conditions associated with transmission of data over said first data channels and including a plurality of first control networks, each one associated with a different one of said first data channels for controlling the state of an associated data channel with one of said first enabling signals, each of said first control networks including enabling means responsive to one or more first alarm signals for forcing an associated one of said first data channels inactive,
second transmission means including a plurality of independent and redundant second data channels wherein each of said second data channels is activated to transmit data by a different second enabling signal,
second channel control means including second alarm means for providing second alarm signals in response to alarm conditions associated with transmission of data over said second data channels and including a plurality of second control networks, each one associated with a different one of said second data channels for controlling the state of an associated second data channel with one of said second enabling signals, each of said second control networks including enabling means responsive to one or more second alarm signals for forcing an associated one of said second data channels inactive.

14. A data transmission network for transmitting data comprising, first transmission means including a plurality of independent and redundant first data channels wherein each of said first data channels is activated to transmit data by a different one of first enabling signals, first connection means having a plurality of redundant first stores for providing data as an input to an enabled one of said first data channels, first channel control means including first alarm means for providing first alarm signals in response to alarm conditions associated with transmission of data over said first data channels; including a plurality of first control networks, each one associated with a different one of said first data channels, for generating one of said first enabling signals in response to one or more of said first alarm signals to force an associated one of said first data channels inactive; and including first selection means for connecting one of said first stores to an enabled one of said first data channels, second transmission means including a plurality of independent and redundant second data channels wherein each of said second data channels is activated to transmit data by a different one of second enabling signals, second connection means having a plurality of redundant second stores for receiving said data from an enabled one of said first data channels and for providing said data to an enabled one of said second data channels, second channel control means including second alarm means for providing second alarm signals in response to alarm conditions associated with transmission of data over said second data channels; including a plurality of second control networks, each one associated with a different one of said second data channels, for generating one of said second enabling signals in response to one or more of said second alarm signals to force an associated one of said second data channels inactive; and including second selection means for connecting one of said second stores to an enabled one of said second data channels.

15. A data transmission network for transmitting data comprising, first transmission means including independent and redundant first and second data channels wherein said first and second data channels are each activated to transmit data by first and second enabling signals, first connection means having redundant first and second stores for providing data as an input to an enabled one of said first and second data channels, first channel control means including first alarm means for providing first alarm signals in response to alarm conditions associated with transmission of data over said first and second data channels, including first and second control networks for generating said first and second enabling signals, respectively to control the active state of said first and second data channels, respectively; and including first selection means for connecting one of said first and second stores to an enabled one of said first and second data channels, respectively, second transmission means including independent and redundant third and fourth data channels wherein each of said third and fourth data channels is activated to transmit data by third and fourth enabling signals, respectively, second connection means having redundant third and fourth stores for receiving data from said enabled one of said first and second data channels, second channel control means including second alarm means for providing second alarm signals in response to alarm conditions associated with transmission of data over said third and fourth data channels; including third and fourth control networks for generating said third and fourth enabling signals, respectively to control the active state of said third and fourth data channels, and including second selection means for connecting one of said third and fourth stores to an enabled one of said third and fourth data channels, respectively.

* * * * *

UNITED STATES PATENT AND TRADEMARK OFFICE
CERTIFICATE OF CORRECTION

PATENT NO. : 4,030,069
DATED : June 14, 1977
INVENTOR(S) : Henrickson, Gary C.; and McDonald, John C.

It is certified that error appears in the above-identified patent and that said Letters Patent are hereby corrected as shown below:

```
Claim 1, Column 14, line 59, between "data" and "to",
    insert--channel--.

Claim 2, Column 14, line 63, between "an" and "to", delete
    "output" and substitute therefor--input--.

Claim 10, Column 16, line 6, between "higher" and "and",
    delete "priorty" and substitute therefor--priority--.

Claim 11, Column 16, line 21, between "means" and "to",
    delete "responisve" and substitute therefor--responsive--.

Claim 15, Column 18, line 16, between "channel" and "in-",
    delete "," and substitute therefor--;--.
```

Signed and Sealed this thirtieth Day of August 1977

[SEAL]

Attest:

RUTH C. MASON
Attesting Officer

C. MARSHALL DANN
Commissioner of Patents and Trademarks